Figure 1:
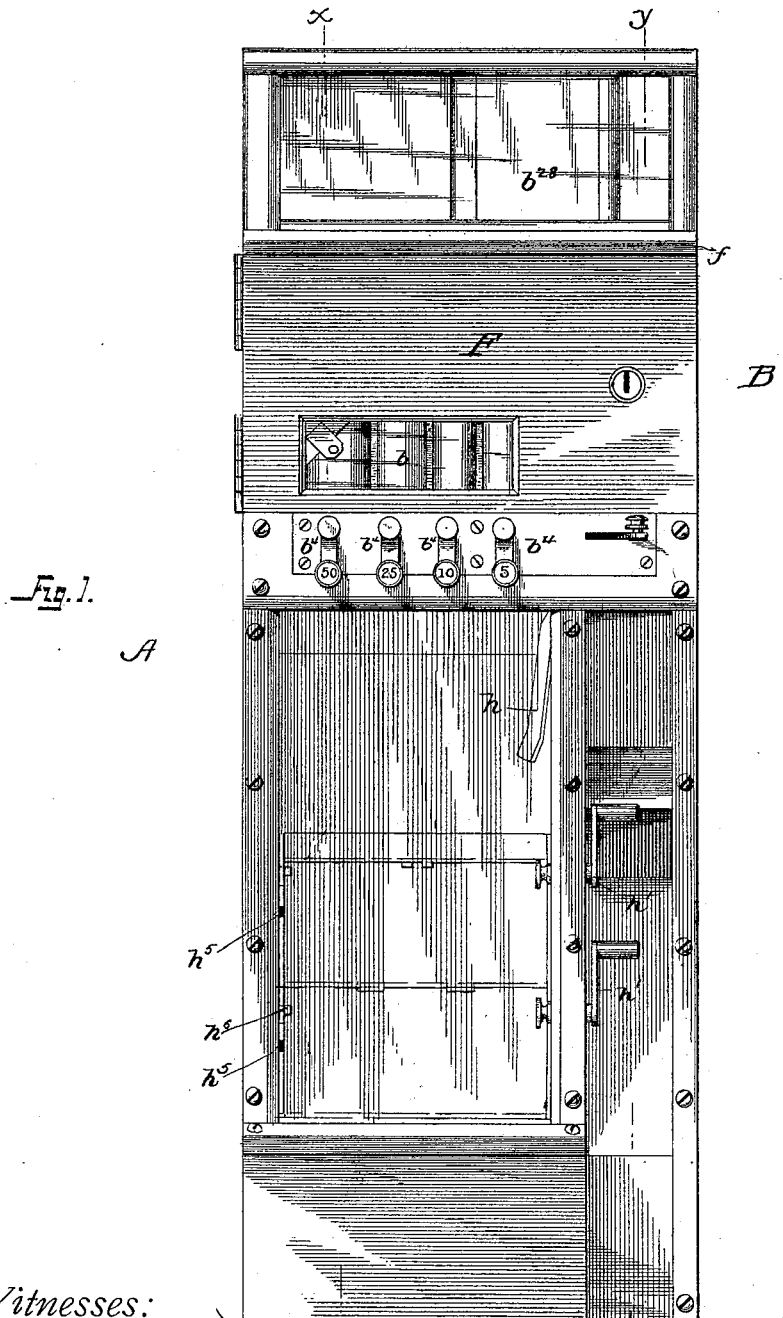

(No Model.) 7 Sheets—Sheet 1.

J. L. KAIL.
COMBINED FARE BOX AND CHANGE MAKER.

No. 370,261. Patented Sept. 20, 1887.

Witnesses:
W. W. Mortimer
L. W. Norris

Inventor:
John L. Kail,
by R. S. Dyrenforth
his Attorney.

(No Model.) 7 Sheets—Sheet 2.

J. L. KAIL.
COMBINED FARE BOX AND CHANGE MAKER.

No. 370,261. Patented Sept. 20, 1887.

Witnesses:
N. W. Mortimer
L. W. Norris

Inventor:
John L. Kail,
by R. S. Dyrenforth
his Attorney.

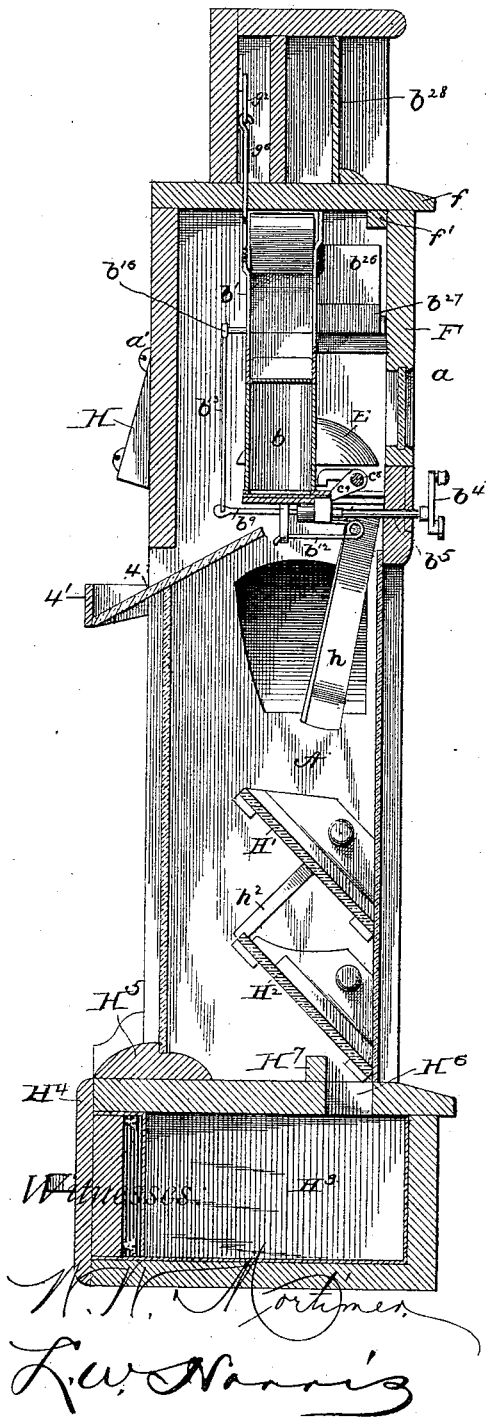

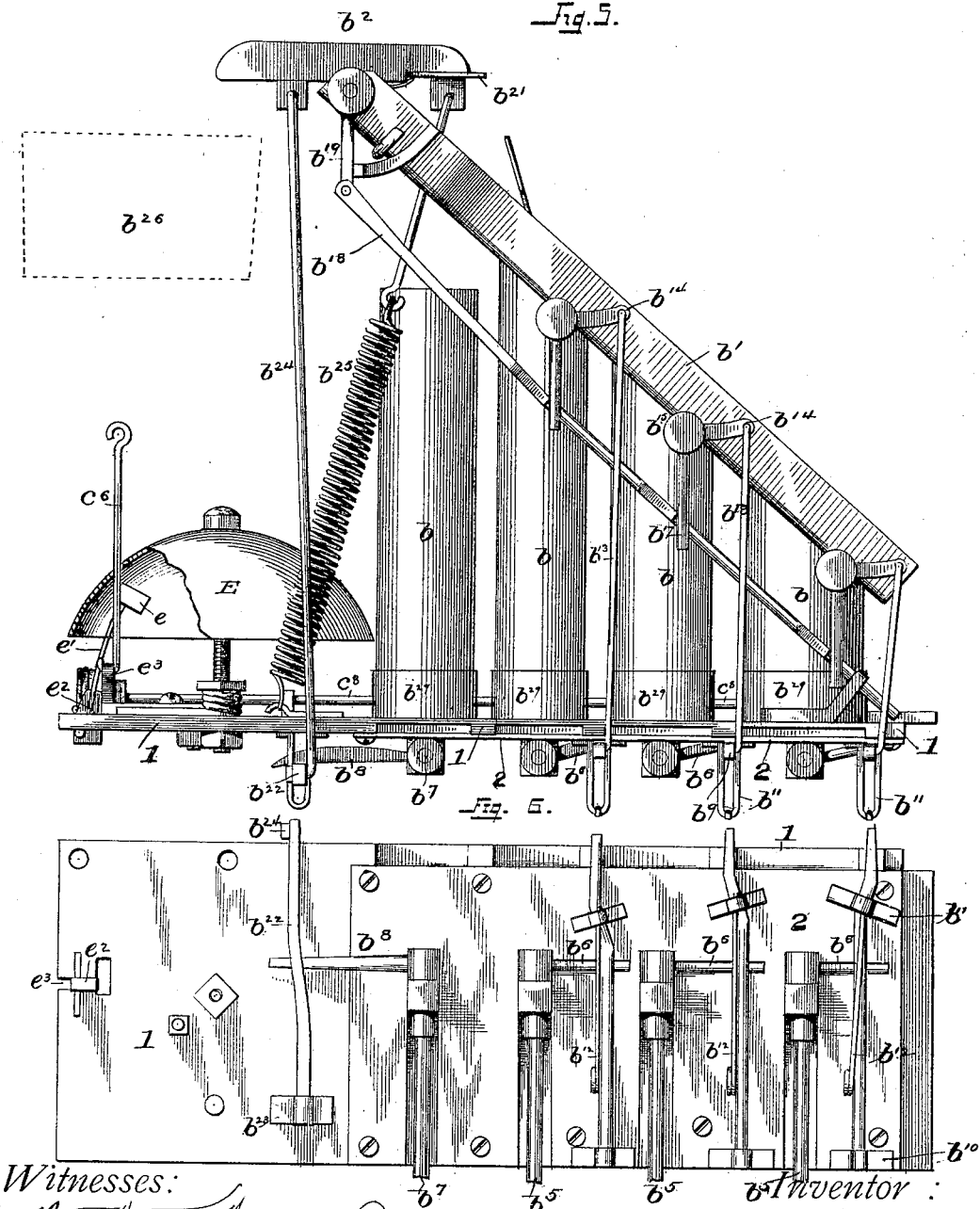

(No Model.) 7 Sheets—Sheet 5.
J. L. KAIL.
COMBINED FARE BOX AND CHANGE MAKER.
No. 370,261. Patented Sept. 20, 1887.
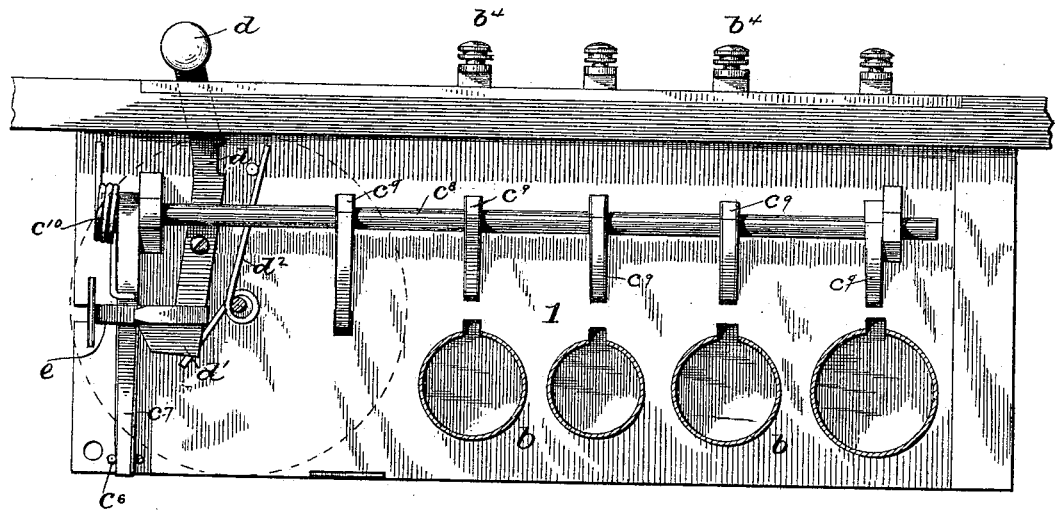
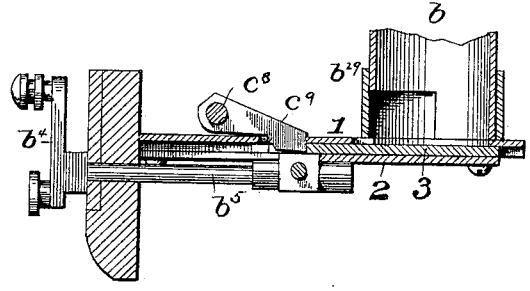
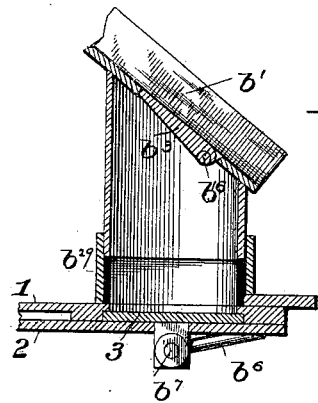
Witnesses:
W. N. Mortimer
L. W. Harris
Inventor:
John L. Kail,
by
R. S. Dyrenforth
his Attorney.

(No Model.) 7 Sheets—Sheet 6.

J. L. KAIL.
COMBINED FARE BOX AND CHANGE MAKER.

No. 370,261. Patented Sept. 20, 1887.

Witnesses:

Inventor:
John L. Kail,
by
his Attorney.

(No Model.) 7 Sheets—Sheet 7.

J. L. KAIL.
COMBINED FARE BOX AND CHANGE MAKER.

No. 370,261. Patented Sept. 20, 1887.

Witnesses: Inventor:
 by John L. Kail,
 his Attorney.

UNITED STATES PATENT OFFICE.

JOHN LIDA KAIL, OF BOONE, IOWA, ASSIGNOR OF TWO-THIRDS TO IRA B. HODGES AND A. B. HODGES, OF SAME PLACE.

COMBINED FARE-BOX AND CHANGE-MAKER.

SPECIFICATION forming part of Letters Patent No. 370,261, dated September 20, 1887.

Application filed October 22, 1886. Serial No. 216,955. (No model.)

*To all whom it may concern:*

Be it known that I, JOHN LIDA KAIL, a citizen of the United States, residing at Boone, in the county of Boone and State of Iowa, have invented certain new and useful Improvements in Fare and Money Boxes; and I do hereby declare the following to be a full, clear, and exact description of the invention, such as will enable others skilled in the art to which it appertains to make and use the same.

This invention relates to fare-boxes designed for use on street-cars.

Heretofore it has been customary on street-cars on which drivers only are employed to provide the driver with a box from which he changes money handed him by the passengers. This manner of giving change is troublesome, particularly in cold weather, when the driver wears gloves or mittens, and entails the necessity upon the driver of always taking the change-box with him when leaving the car, in order to prevent theft.

The objects of the invention are to provide a single structure capable of acting as a change-making device and a receiving, collection, or fare box; to enable the driver to give the proper change to a passenger without touching the money; to prevent the driver giving change to a passenger until the latter has supplied a proper piece of money; to enable the change-box to be left without danger of theft; to be able to attract the attention of the driver by the deposit of a piece of money in the receptacle; to set the mechanism in position to deliver change by the act of deposit of the money and upon attraction of the attention of the driver; to prevent the accidental discharge of the fare into the receptacle before it has been properly counted and compared, and, finally, to prevent the cash-receptacle from being robbed, even should the glass of the fare-box be broken for the purpose.

With these objects in view the invention consists in a combined fare-box and change-making receptacle; also, in the construction and arrangement of parts, hereinafter described, shown in the drawings, and pointed out in the claims.

Figure 2:
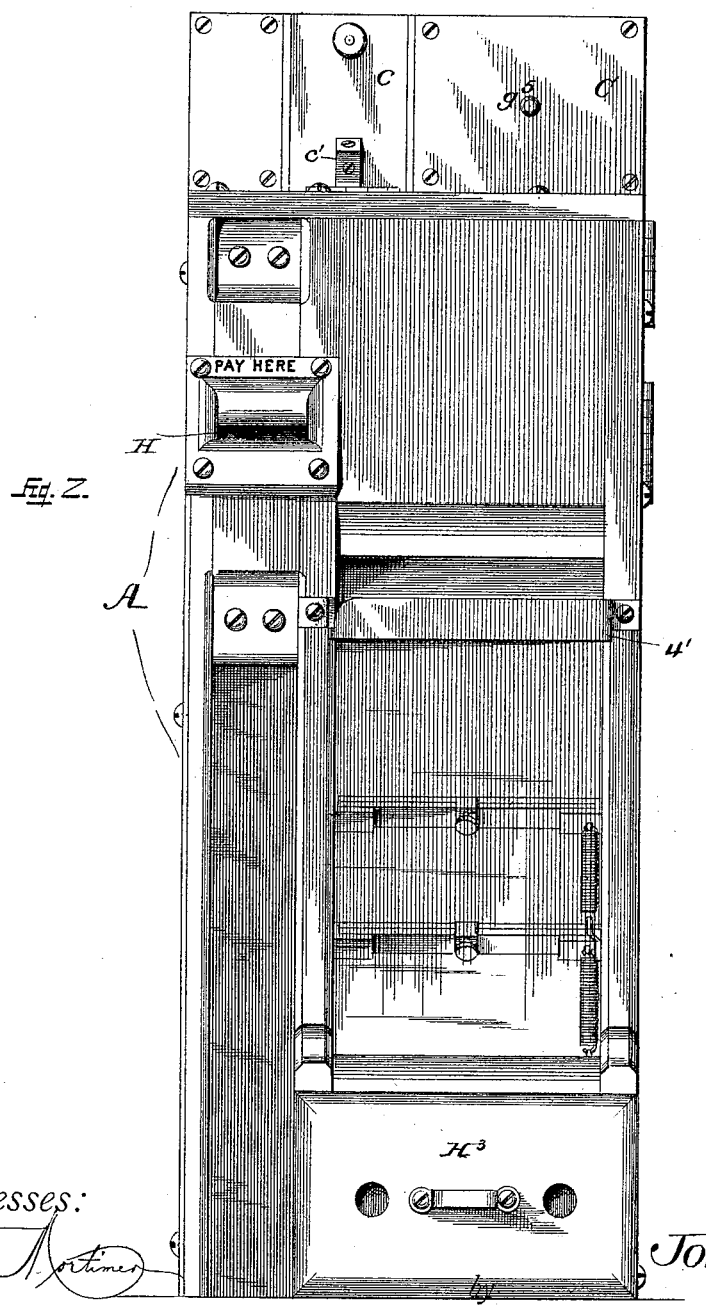
Figure 10:
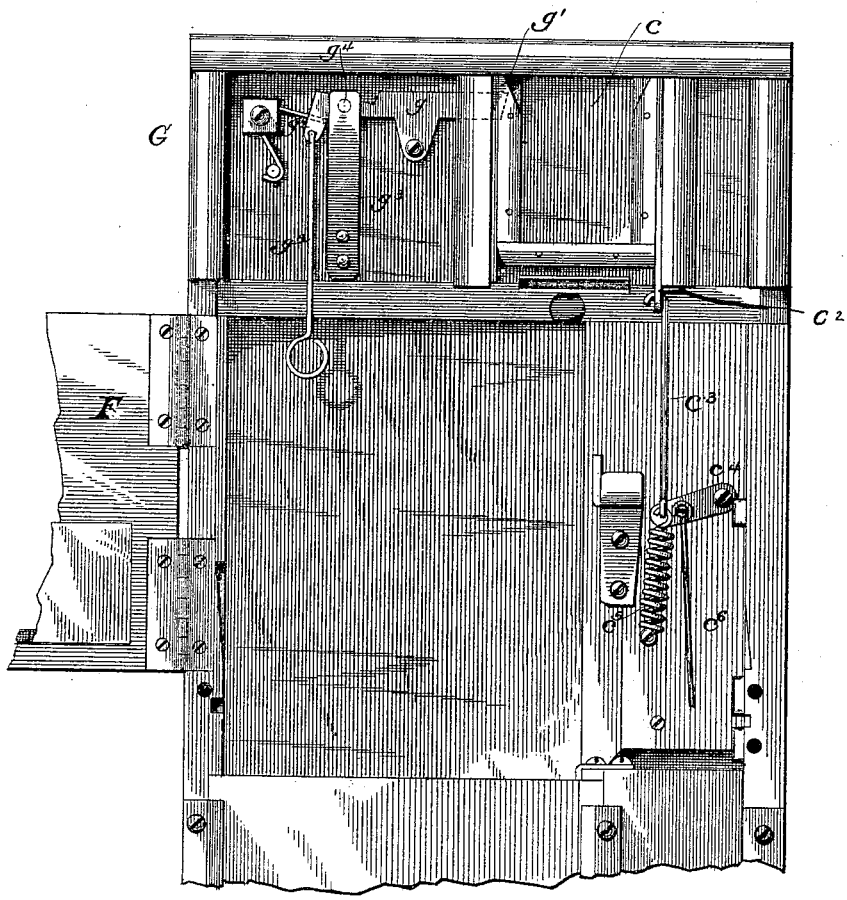
Figure 11:
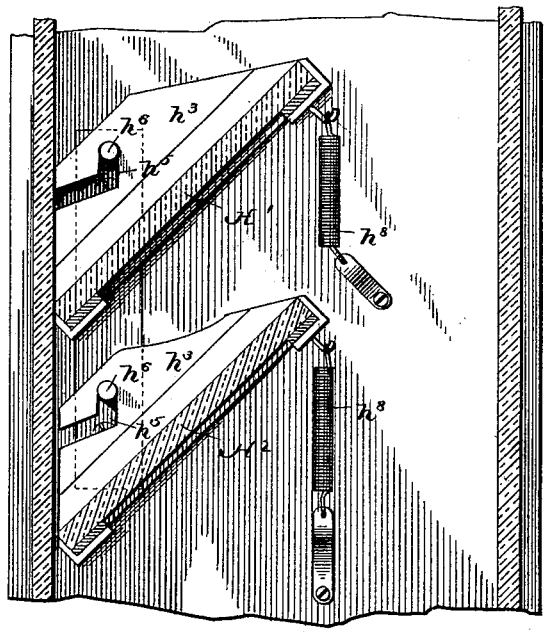
Figure 12:
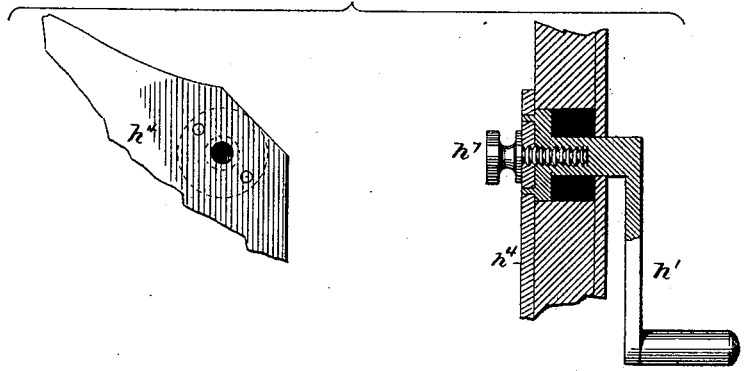

In the accompanying drawings, forming part of this specification, illustrating one form of embodiment of the invention, and in which like letters and figures of reference indicate corresponding parts, Figure 1 is a view in elevation of the outer face of the combined fare-box and change-making receptacle. Fig. 2 is a view in elevation of the inner face thereof. Fig. 3 is a view in vertical section on the line $x$ $x$ of Fig. 1, looking toward the center of the box from one side. Fig. 4 is a view in vertical section on the line $y$ $y$ of Fig. 1, also looking toward the center of the box, but from the opposite side. Fig. 5 is a view in side elevation of the mechanism of the change-receptacle detached. Fig. 6 is an inverted plan view of the base or plate upon which the change mechanism rests. Fig. 7 is a plan view of the change-receptacles, showing means for preventing the removal of change therefrom and the bell-operating mechanism. Fig. 8 is a detail sectional view showing the means whereby coins may be removed from the receptacles one at a time. Fig. 9 is a sectional view in detail, showing a receptacle and the chute provided with a door, whereby coins are conveyed and directed to the receptacle. Fig. 10 is an elevation showing the door through which change is introduced by passengers, means for locking the same when so desired, and part of the means for operating the bell mechanism. Fig. 11 is another view in section on the line $x$ $x$ of Fig. 1, but looking away from the center of the box and against the inner face of a side, showing the bayonet-slots in the shelves and pins in the side of the box. Fig. 12 is a view in detail of one of the bosses at the side opposite to that at which are the pins.

The box is designed to be placed in the front of a car in such manner that one side shall be accessible to the passengers within the car and the other side be convenient to the driver.

In the drawings, A represents the combined fare-box and change-making receptacle, the letter $a$ indicating the side thereof which is outside of the car and near the driver's stand, and $a'$ the side which is within the car. (See Figs. 3 and 4.) The upper portion of the box is occupied by the change-receptacle B, constructed as follows:

The letter $b$ designates a row of upright tubes graduated in diameter to hold, respectively, fifty, twenty-five, ten, and five cent pieces. They also increase in height from the fifty-cent tube to the ten-cent tube, which is about the height of the five-cent tube.

The lower ends of these tubes open through a base-plate, 1, secured within the casing or frame of the box adjacent to its outer face, but not extending across to the inner face. The plate 1 has fastened to its lower side a plate, 2, as shown in Figs. 5 and 6, and secured within a suitable opening in the frame, with its inner end immediately below the inner edges of the plates 1 and 2, is a plate, 4, which has upon its rim outside—that is to say, on the side which projects beyond the box into the car—an upward-extending ledge, 4', to prevent coins, money, or the like from passing off the plate.

$b'$ is a chute which extends along the tops of the cylinders $b$, and into its floor open the fifty-cent, twenty-five-cent, and ten-cent cylinders. The five-cent cylinder, however, does not open there, for reasons hereinafter explained, the chute being some distance above it. The upper end of the chute has its floor cut away and has pivoted or journaled in its sides the central transverse shaft of a tilting platform, $b^2$, which can be turned so that its inner end will rest above an inclined plane rising from the floor of the chute. The money to be changed is placed upon this platform through a door, hereinafter described, and is thrown upon the chute therefrom.

$b^3$ $b^3$ are doors closing openings in the floor of the chute over the cylinders, having their lower edges journaled in the sides of the chute, and capable of having their free edges turned upward by mechanism hereinafter described. When the doors are closed, they are flush with the floor; but when any one is turned up it is evident that a piece of money descending the chute will be directed into the cylinder below.

$b^4$ $b^4$ are vertical cranks or keys, each of which corresponds to one of the cylinders, and has marked upon it at any suitable point the number—such as 50, 25, 10, or 5—of the cylinder to which it corresponds. Each key of the cylinders is connected with the chute, and has secured to it a key-shaft, $b^5$, which turns when the key is turned. The key-shafts $b^5$ have their outer bearings in a detachable part of the casing of the box, to which the plates 1 2 are attached, and their inner bearings in rectangular studs or projections which depend from plates 3, moving between the plates 1 and 2 in suitable shallow recesses in the former, (see Figs. 5 and 6,) the studs passing through long slots made in the edge of the plate 2. (See Fig. 6.) The studs have collars on both sides of them on the shafts, so that the plates 3 will be moved inward and outward as the said shafts are pushed inward or pulled outward. The shafts rotate easily in the openings in the studs.

Projecting laterally from the inner set of collars on the key-shafts are arms $b^6$, which stand in the same direction as the lower end of the chute and serve a purpose hereinafter described.

$b^7$ is the shaft of the key belonging to the five-cent cylinder, and is similar to the shafts $b^6$ of the other keys, except that its arm or projection $b^8$, Fig. 6, stands in the opposite direction to that of the arms of such other keys. Each arm $b^6$ bears upon the upper side of a rod, $b^9$, which has its outer end pivoted between the arms of a bracket, $b^{10}$, depending from the plate 2, and which passes near its inner end through a yoke-bracket, $b^{11}$, which limits its motion when pressed downward by the arm $b^6$.

$b^{12}$ is a wire spring, one end of which is secured by solder or otherwise to the end of the bracket $b^{11}$ and the other end similarly secured to the rod $b^9$ near said bracket, the central part of the spring being bent into several coils to increase its force. The spring $b^{12}$ acts against or in the opposite direction to the arm $b^6$. The inner end of each bar $b^9$ is pivoted to the lower end of a link-rod, $b^{13}$, the upper end of which is pivoted to the end of the arm $b^{14}$ of the crank-lever $b^{15}$, secured upon the shaft $b^{16}$, (see Fig. 9,) upon which the door $b^3$ of the corresponding cylinder is fixed, so that when the rod $b^9$ is depressed by the arm $b^6$ the said door is raised to allow a coin to pass into the cylinder below.

The depending arms $b^{17}$ of the crank-levers impinge against the lower edges of similar shoulders, Fig. 5, on a reciprocating bar, $b^{18}$, similarly inclined to the chute on the side thereof. The lower part of said bar passes through an opening in an upright secured in proper position to the plate 1, and between the arms of its upper bifurcated end is pivoted the end of an arm, $b^{19}$, depending from a boss on the extended shaft of the tilting platform $b^2$. Thus, when the rod $b^9$ is depressed, as described, the crank-lever will be pulled down, and its arm $b^{17}$ will move the bar $b^{18}$ upward by means of the arm $b^{19}$, partly rotating the shaft of the platform and inclining the latter in the proper direction to throw a coin upon the chute, the tilting of the platform and the opening of the door of the cylinder being performed by the same mechanism and simultaneously, so that the coin deposited upon the platform will slide into the cylinder. After the rod $b^9$ is released, the bar is moved downward, partly by one of the springs $b^{12}$ and partly by a spring, $b^{20}$, Fig. 4, having its free ends resting upon a transverse bar secured to the sides of the upper end of the chute. The upper portions of the spring $b^{20}$ are coiled around the shaft of the tilting platform, a loop between the coils passing upward against a plate, $b^2$, standing outward from the shaft of the platform, and upon which the platform rests when horizontal. The arm $b^8$, standing from the shaft $b^7$ of the key of the five-cent cylinder, presses down on a rod, $b^{22}$, having its inner end pivoted within a looped bracket, $b^{23}$, depending from the lower surface of the plate 1, Fig. 5. The outer end of the rod $b^{22}$ is pivoted to the lower end of a link-rod, $b^{24}$, the upper end of which is pivoted to a projection, a stud depending from the tilting platform $b^2$ at a point on the outer side of its shaft.

$b^{25}$ is a coiled spring, having its lower end properly attached to the plate 1, and its upper end attached to the lower end of a rod hooked or pivoted at its upper end to a stud depending from the tilting platform at a point on the inner side of its shaft. By turning the arm $b^8$ downward the rod $b^{22}$ will be depressed, and will, by means of the link-rod $b^{24}$, tilt the outer end of the platform downward, or in the opposite direction to that in which it is tilted by the bar $b^{18}$. The spring $b^{25}$ returns the platform to its normal position when the action of the arm $b^8$ ceases. The platform, when tilted by the link-rod $b^{24}$, throws its contents into a box, $b^{26}$, resting upon a suitable support, $b^{27}$, secured to a proper point of the main frame. This box is intended to receive bills and such pieces of money as cannot enter the cylinders. The key of the five-cent cylinder is used to turn the platform to empty into the box $b^{26}$, because the said cylinder does not open into the chute, as five cents being the usual rate of fare no one desires to change the same. The cylinder is only used in making change for coins of larger denomination.

The mode of making change is as follows: The passenger places a coin—say twenty-five cents—upon the platform $b^2$ through a door, hereinafter described. Through the glass $b^{28}$, Fig. 1, on the side of the frame adjacent to the driver the latter sees the same upon the platform and tilts the platform and opens the door of the twenty-five-cent cylinder by the means described. He then, by means of the proper key and shaft, draws outward the plate 3 under the ten-cent cylinder, so that a coin of that denomination falls through the opening in the plate 1 upon the plate 2. Then, by pushing the plate inward again, the latter drives a coin from between the plates 1 and 2 upon the inclined plate 4. Having again pushed out a ten-cent piece, he pushes out a five-cent piece in a similar manner, all of which slide down the plate 4 to the ledge 4', to be within reach of the passenger.

Each plate 3 should be equal in thickness to the coin in the corresponding cylinder, so that when it has pushed one coin out and has been drawn outward and another coin has descended to take its place its edge will impinge on one coin only and drive the same out. The lower ends of the cylinders are cut away above the plate 1 for about an inch in height and for at least one-half of the circumference, and a sliding sleeve, $b^{29}$, surrounds the said ends. This sleeve can be lifted if the cylinder needs cleaning; or if a foreign coin or coin of wrong denomination is inserted in the cylinder by raising the sleeve it can easily be removed.

It is desirable that the conductor shall not be able to make change except at the time that money is introduced for the purpose. The change mechanism C for this is as follows:

$c$ is the door through which the money is deposited upon the platform. This door is situated opposite the glass $b^{28}$ in the upper part of the casing, and has its lower edge hinged to the casing with a stop-block, $c'$, on its outer side, (see Fig. 2,) which prevents its being pulled too far down.

$c^2$ is a projection depending from the lower and outer corner of the door within the casing, and $c^3$ is a link-rod having its upper end hooking in a perforation in said door or pivoted thereto. The lower end of this rod is similarly secured to one end of a lever, $c^4$, the other end of which is pivoted on the inner surfaces of the casing.

$c^5$ is a coiled spring connected at one end to the movable end of the lever and at other end secured to the casing. It is evident that when the door is pulled open the spring will be under tension, so that its function is to close the door.

$c^6$ is a link-rod having its upper end securely looped over a pin on the lever $c^4$ and its lower end hooked or pivoted to the movable end of a horizontal lever, $c^7$, which is secured upon and projects inward from the adjacent end of a rock-shaft, $c^8$, (see Fig. 7,) which has bearings in uprights rising from the plate 1. The rock-shaft is parallel to the series of cylinders and is provided at suitable points with arms $c^9$, having at their ends downward projections which normally (or when the door $c$ is shut) rest in recesses in the plate 1, (see Fig. 8,) and, impinging against the outer edges of the plates 3, prevent the key-shafts from being moved in and out, and consequently prevent change from being made in the described manner. When the door is opened, however, the action of the links $c^3$ $c^6$ and lever $c^4$ partially rotates the shaft $c^8$ and lifts the arms $c^9$ out of the slots, so that the key-shafts can be slid out and in and change can be made.

$c^{10}$ is a coiled spring having one end secured to the plate 1 and the other end to the lever $c^7$, its function being to depress said lever and return the arms $c^9$ into their respective slots.

It is desirable to keep the door $c$ open for a sufficient time to make change, and the mechanism D for doing the same is as follows.

$d$ is a lever pivoted about centrally upon the plate 1, the outer arm passing through a slot in the side of the casing and provided with a proper handle at its end, and the inner arm having an outward-projecting point, $d'$, at its end.

$d^2$ is a suitable spring supported by pins or secured to the plate 1 and tending to press the point $d'$ toward the lever $c^7$. The spring $c^{10}$ is coiled on the end of the shaft $c^8$, bearing, as before said, at one end against the plate 1 and at the other against the lever $c^7$. When the door is opened and the lever $c^7$ is raised, as described, the point $d'$ is pressed under the said lever by the spring, holding it up and preventing the arms $c^9$ from entering the recesses. At the same time the link-rods $c^3$ and $c^6$, as they cannot descend keep the door from closing. When change has been made, the driver, by means of the handle on the outside, pulls the lever $d$ in the direction to draw the point $d'$ from beneath the lever $c^7$. The spring $c^5$ then closes the door, and the spring $c^{10}$ returns the arms $c^9$ to their normal positions in the slots by pushing down the lever $c^7$, and thus turning the shaft $c^8$ bearing these arms.

In order that the driver may be made aware of the opening of the door $c$, a bell, E, is secured upon the top of a standard rising from a suitable point of the plate 1, and a hammer, $e$, (see Fig. 5,) is sustained within it on the top of a spring-standard, $e'$, a block on the lower end pivoted in a notch, $e^3$, in the plate 1. The said block is in such position that when the lever $c^7$ is pulled upward the point $d'$ will strike against the block and throw the hammer against the bell. Thus the opening of the door, the ringing of the bell, and the releasing of the plates 3 and the key-shafts are simultaneous.

F is a door forming part of the outer side of the casing, hinged at one side and having a lock at the other end. The driver by opening this door has access to the whole of the change-receptacle mechanism, either to clean the same or for other necessary purposes.

Should the driver leave the car, it is desirable that he should be able to lock the door $c$, to prevent tampering with the money-changing mechanism. The mechanism G for accomplishing this is as follows:

$g$, Fig. 10, is a latch-bar having a central depending projection pivoted upon the inside of the casing near the top of the same, and with the end of its inner arm adapted to enter a recess, $g'$, in the adjacent edge of the door $c$, the said end resting in a slot in the partition on the side of said edge.

$g^2$ is a suitable spring, properly attached to the inside of the casing and with its free end bearing upon the end of the outer arm of the latch-bar $g$ and forcing the same upward, so as to partially rotate the end of the inner arm into the recess $g'$.

$g^3$ is a plate-spring secured at its lower end to the casing, and having near its upper end an outwardly-standing pin, $g^4$, which, when the latch-bar is disengaged from the recess $g'$, engages the upper edge thereof and prevents the spring $g^2$ from actuating it.

$g^5$ is a disk which rests against the outer surface of the spring $g^3$, and has a stud passing through an opening in the casing, so that it can be pressed from outside.

The driver, wishing to leave the car, locks the door F and presses upon said stud, in order to cause the disk $g^5$ to force the spring $g^3$ inward. This moves the pin $g^4$ from the edge of the latch-bar, and the spring $g^2$ immediately causes the latter to engage in the recess $g'$, the pin $g^4$ resting upon the side of the latch-bar. The door $c$ is thus locked and remains so until the driver returns, unlocks and opens the door F, and pulls on the finger-hold at the lower end of the hanging rod $g^6$, the upper end of which is hooked or pivoted to a projection standing downward from the end of the outer arm of the latch-bar, thus pulling the said outer arm below the pin $g^4$ and unlocking the door $c$. The door F is then locked and the device is again in working condition. The passenger, having received his change, places the fare in the opening H, from which it passes down an inclined plane or chute, as in the ordinary construction, and strikes against the leaf-spring $h$, which is so inclined and in part twisted upon itself as to throw the coin toward the top of the inclined tilting plate H', and as each coin descends with a slightly-different force and in a slightly-different direction the spring will cause the fares to be scattered along the lower edge of said plate, and thus be presented in a manner enabling the driver more readily to count them.

H² is an inclined tilting plate in all respects similar to the plate H', and $h^2$ is an arm projecting from one end of the plate H' and resting upon the upper edge of the plate H², so that the latter plate cannot be tilted without simultaneously tilting the former plate, or unless the former plate is turned. Each plate H' H² is secured in place in the same manner. $h'$ $h'$ are crank-handles for tilting the plates.

$h^3$ $h^4$ are the end plates of the frames of the tilting plates. The plate $h^3$ is provided with a bayonet-slot, $h^5$, in which a pin, $h^6$, enters, the end of the slot being rounded, so that the plate $h^3$ can turn on said pin as a bearing-point. The plate $h^4$ is provided at a point opposite the end of the slot with an opening, through which passes the stem of the thumb-nut $h^7$. The crank-handles $h'$ have each a boss, which enters a suitable opening in the side of the casing, and is provided with a central threaded recess to engage the threaded stem of the thumb-nut $h^7$. The said boss has pins on its inner surface, which enter corresponding openings in the plate $h^4$, so that should the thumb-screw become detached the handle would still actuate the tilting plate. $h^8$ is a coiled spring with the upper end attached to the upper edge of the tilting plate and the lower edge secured to the adjacent side of the casing. This construction is very advantageous, both from the simplicity and fewness of the parts and the ease with which the tilting plates are removed from the casing, which is accomplished as follows: The lower end of the springs are detached from the casing, the thumb-nuts are removed, and the crank-handles pulled out from the casing. The plates can then be removed by sliding the pins $h^6$ out of the bayonet-slots $h^5$.

H³ is the cash-box, within the lower part of the casing and receiving the fares from the lower plate, H², Fig. 3. The cash-box itself is of ordinary construction, except that it has an upright flange, H⁴, which abuts against the end of a slide, H⁵, the side edges of which enter grooves in the side of the casing.

When the cash-box is locked in place in any suitable manner, the slide cannot be removed, and as it entirely covers the open top of the cash-box, with the exception of the fare-slot H⁶, protected by the transverse rib H⁷, the cash-box cannot be robbed should the glass on the inner surface of the casing be broken.

By unlocking and removing the cash-box, pulling out the slide H⁵, pulling down the glass which it supports, Fig. 3, to the grooves in which the slide H⁵ moves, and then pushing the glass to the right, the latter may be removed from its grooves, which are arranged for the purpose, and access may be had to the interior of the casing to clean the same, or to remove the tilting plates in the manner described.

To remove the change-receptacle and the working mechanism thereof, unlock and open the door F. Then draw out the slide $f$, which is retained in place by its flange $f'$ resting against the inside of the door. When the latter is locked, pull down the glass $b^{23}$, push it to the left side, and then turn it out of its grooves. Then remove the four screws that hold the detachable strip of the frame, through which the key-shafts pass, disconnect the door $c$ from the lever $c^7$ by detaching the link-rod $c^6$ from the lever $c^4$, and the said receptacle and mechanism can be clipped out entire.

When a coin is placed on the platform $b^2$, it can only fall either on the chute or the box $b^{26}$, as the glass $b^{28}$ is close to its side and partial partitions, forming part of the frame-work, are adjacent to its ends.

Having thus fully described my invention, what I claim as new, and desire to secure by Letters Patent, is—

1. A structure for use in street-cars and other places, consisting of a fare-box and a coin-assorter and change-maker.

2. A change-making device in which coins deposited by an act on the deposit side are assorted into appropriate receptacles, afterward to be presented from such receptacles back to deposit side by an an act from another side, substantially as described.

3. A fare-box to be used in street-cars and other situations, provided with a change-making device controlled by the driver or director, in which the driver or director does not handle the change, and in which change can only be made after an act upon the device by the person paying, substantially as set forth.

4. The combination of the tilting platform, the cylinders, the chute, the door in the floor of the chute-covering, the openings into the cylinders, and mechanism, substantially as described, whereby the platform can be tilted and any desired door opened simultaneously, substantially as specified.

5. The combination of the tilting platform, the cylinders of different diameters to hold coin of different denominations, the chute leading from the platform over the tops of the cylinders, the pivoted doors in the floor of the chute, the shafts turned by suitable keys and connected by mechanism, substantially as described, both with the tilting platform and the pivoted doors to actuate the platform and any desired door simultaneously, substantially as specified.

6. The combination, with the tilting platform, chute, doors, and cylinders, all constructed substantially as described, of the key-shafts having lateral projections on their inner ends, the pivoted levers depressed by said projections, the springs acting on the levers against said projections, the link-rods, the crank-levers on the extended pivotal shafts of the doors connected to the shaft projections by the link-rods, and mechanism, substantially as described, to actuate the tilting platform simultaneously with the opening of any one door, substantially as specified.

7. The combination, with the tilting platform, chute, doors, cylinders, key-shafts provided with lateral projections, pivoted levers depressed by said projections, and spring acting on said levers oppositely to the projections, of the link-bars, crank-levers on the shafts of the doors connected to pivoted lever by the link-bars, reciprocatory bar provided with shoulders acted upon by the depending arms of the crank-levers, and having its upper end pivoted to a rod depending from the shaft of the platform, and a spring secured to said shaft to return the platform to its normal position after being tilted by the reciprocatory rod, substantially as specified.

8. The combination of the box $b^{26}$, the tilting platform, coiled spring secured to the base-plate at its lower end and to a rod loosely connected to the platform at a point to the inner side of its shaft, link-rod depending loosely from the platform at a point to the outer side of its shaft, pivoted lever bearing its movable end pivoted to the lower end of said link, and key-shaft provided with a lateral projection to depress said lever, substantially as specified.

9. The combination of the cylinders, each cut away at its lower point for at least one-half of its diameter, and the sleeves sliding on said cylinders to close said cut-away portions, with the mechanism, substantially as described, to deposit coin in said cylinders.

10. The combination of the cylinders, the sliding plates below the cylinders, and the key-shafts secured and moving said plates in recesses in the base-plate on which the cylinder rests with the rock-shaft provided with arms arranged to enter slots in said base-plate and impinge against the outer edges of the sliding plates, the door in the casing through which money is passed for change, and mechanism, substantially as described, connecting the said door and rock-shaft in such manner that when the door is opened the rock-shaft will be so turned as to lift its arms out of engagement with the sliding plates, substantially as specified.

11. The combination of the cylinders, sliding plates, key-shafts, rock-shaft provided with arms to engage the sliding plates, substantially as described, the downwardly-extending arm on the end of the rock-shaft, and spring to depress said arms with the hinged door in the casing to receive money on the tilting platform, having a depending projection from its lower edge, the link-rod hanging from said projection, the pivoted lever connected with the lower end of said link, the link-rod connecting said lever with the end of the arm on the rock-bar, and the spring to close the door, substantially as specified.

12. The combination, with the door to receive money on the tilting platform, the rock-shaft, the spring-depressed arm on the end of the rock-shaft, and mechanism, substantially as described, connecting said arm and the door, of the lever pivoted centrally on the base-plate of the cylinders, with its outer arm extending through a slot in the casing, and a point on the inner arm, and the spring bearing on said lever in order to force its point under the arm on the rock-shaft when the latter is rotated by the opening of the door and keep the said point thereunder until released by moving the outer arm of the lever, substantially as specified.

13. The combination, with the rock-shaft, arm thereon, door through which to deposit money on the tilting platform, and mechanism, substantially as described, to actuate the rock-shaft from the door, of the bell, the hammer sustained on a pivoted standard, the pivoted lever, and the spring bearing on said lever, so as to cause it to strike the hammer-standard and cause the hammer to ring the bell when the arm on the rock-shaft is lifted by opening the door, substantially as specified.

14. In a fare-box, the combination of two tilting plates separately movable and arranged, substantially as described, so that the upper plate can be turned directly by the lower plate, or independently with said lower plate, and the upper plate can also be turned by itself, as specified.

15. In a fare-box, the combination of the upper pivoted tilting plate provided with a rearward projection from one of its side edges, with the lower pivoted tilting plate with its upper edge unconnected with but impinging against said projection, substantially as specified.

16. In a fare-box, the combination, with a fare-receiving tilting plate, of the spring-plate secured to the orifice of the chute leading to within the box, which spring is inclined and bent, substantially as described, to throw the descending fares toward the upper edge of the tilted plate, substantially as specified.

17. In a fare-box, a fare-receiving tilting plate having a bayonet-slot in one of its side plates and an opening in the other side plate opposite the end of the slot, in combination with a pin in the casing to enter the slot, a crank-handle provided with a boss entering an opening on the other side of the casing, and a thumb-screw passing through the opening in the side plate and engaging in a central threaded recess in the bars of the crank-handle, substantially as specified.

18. In a fare-box, the combination, with the fare-receiving or cash box, of the slide entering grooves in the casing above said box, with a flange on the latter pressing against its outer edge, so that it cannot be removed until after the cash-box is removed, substantially as specified.

19. The combination of the door through which money is passed to be changed, having a locking-recess on its edge, the pivoted latch-bar, the locking-spring, the retaining-spring having detent-pins upon it, the releasing-disk, and the rod depending from the latch-bar for the purpose of drawing the same out of the recess, all constructed and arranged substantially as and for the purpose described.

In testimony whereof I affix my signature in presence of two witnesses.

JOHN LIDA KAIL.

Witnesses:
 NORTON A. ELLIS,
 J. H. SCHUNEMAN.